United States Patent [19]

Rogier

[11] 4,372,427
[45] Feb. 8, 1983

[54] INDUSTRIAL EMERGENCY BRAKE

[75] Inventor: Léonce Rogier, Saint-Denis, France

[73] Assignee: VALEO, Paris, France

[21] Appl. No.: 188,917

[22] Filed: Sep. 19, 1980

[30] Foreign Application Priority Data

Sep. 21, 1979 [FR] France .................... 79 23508

[51] Int. Cl.³ ............... F16D 55/08; F16D 59/00; B60T 7/12
[52] U.S. Cl. .......................... 188/72.1; 74/2; 187/89; 188/166; 188/189
[58] Field of Search .............. 188/166, 67, 189, 110, 188/167, 71.1, 71.3, 72.1, 72.3, 31, 60, 69; 187/73-93; 303/80, 85, 78; 403/2; 192/82 T; 74/2

[56] References Cited

U.S. PATENT DOCUMENTS 3,872,949 3/1975 Snyder .................... 188/189 X
3,942,607 3/1976 Sobat .

FOREIGN PATENT DOCUMENTS 1422956 11/1965 France .
1476750 3/1967 France .
2096314 2/1972 France .

Primary Examiner—Douglas C. Butler
Attorney, Agent, or Firm—Charles E. Brown

[57] ABSTRACT

An industrial emergency brake is disclosed having a pair of braking members disposed on opposite sides of a brake member such as a brake disc. A stack of Belleville washers constantly urge each brake member towards engagement with the brake member. A retaining member normally keeps each of the braking members out of engagement with the brake member. The retaining member is a frangible explosive component containing an explosive charge and fractures to permit the stack of Belleville washers to urge the braking member into engagement with the brake member. The retaining member may be a bolt, fixed between a fixed support and the braking member, a nut bearing against the fixed support and in engagement with a stud bolt or a washer between a nut and the fixed support. A set of jacks may be used to disengage the brake.

6 Claims, 7 Drawing Figures

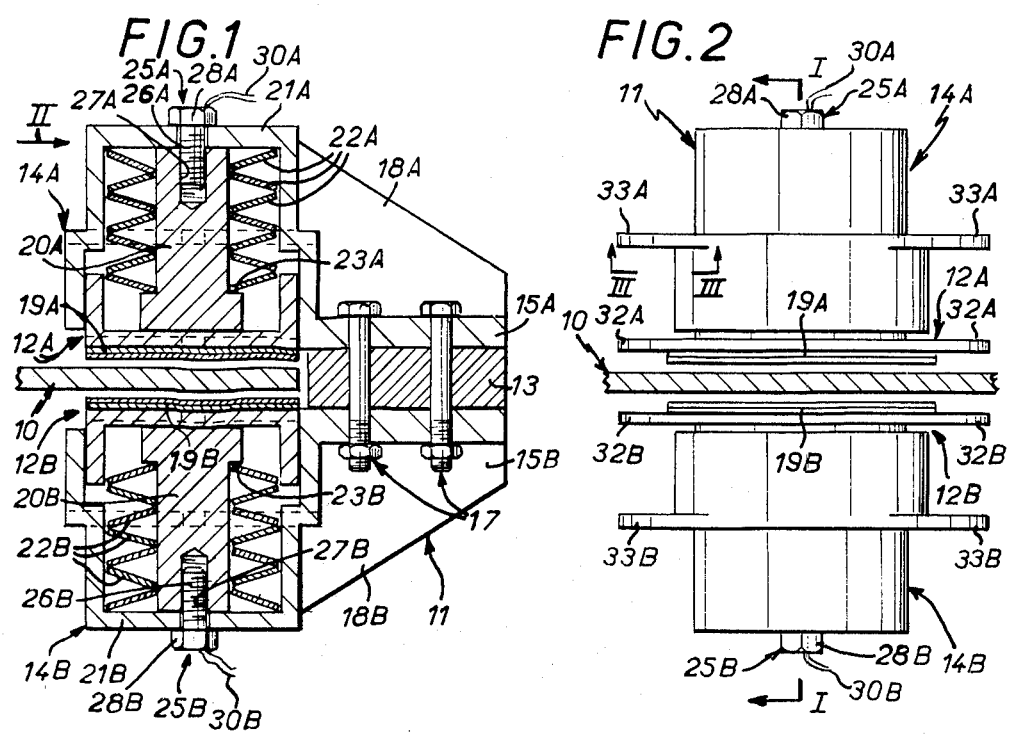

INDUSTRIAL EMERGENCY BRAKE

The present invention relates generally to emergency brakes, that is, brakes which are only intended to be used under exceptional circumstances, in case of emergency.

Such emergency brakes are used notably in industry for hoists, fixes cranes and travelling cranes, for example; they are normally in their open or disengaged position and actuated to their closed or engaged position manually or automatically in case of danger, for example, by means responsive to the speed of a brake member.

Generally speaking such an industrial emergency brake usually comprises a fixed support, a brake member, and a braking member adapted to be applied against the brake member. The braking member is subjected to force-applying means such as resilient means bearing against the fixed support, for example, constantly urging the braking member towads the brake member and to releasable retaining means normally maintaining the braking member spaced from the brake member.

The releasable retaining means which only have a passive function generally comprise an electromagnet or a hydraulic piston-and-cyinder unit. When the releasable retaining means is an electromagnet there is of necessity a constant consumption of energy which is all the more regrettable since, as mentioned above, its function is passive. Further the field of use of such an electromagnet is limited, it being excluded when the retaining force to be applied, which is related to the ultimate braking force, is considerable.

When a hydraulic piston-and-cylinder unit is employed it must be supplied permanently in order to compensate for inevitable leaks to ensure it is maintained under pressure, which reduces the reliability of the system and increases the cost.

According to a general object of the invention there is provided an industrial emergency brake which obviates these drawbacks and has, in addition, other advantages.

According to the invention there is provided an industrial emergency brake comprising a fixed support, at least one braking member adapted to be applied against a brake member, means for constantly urging the or each braking member towards the brake member and releasable retaining means normally maintaining the or each braking member out of engagement with the brake member, characterised in that the releasable retaining means comprise a frangible explosive component containing an explosive charge and adapted to be fractured upon detonation whereupon the means for constantly urging the or each braking member urges the or each braking member into engagement with the brake member.

To be sure, it has already been proposed to use explosive in braking systems and more particularly in emergency braking systems. Such is the case with French Pat. No. 71 21561 published under Publication No. 2,096,314 and with U.S. Pat. No. 3,942,607. Yet in these patents the explosive charge produces a blast which brings about the desired result; the blast causes the displacement of an operating member adapted to actuate the associated braking system. The corresponding systems are accordingly rather complex.

Such is not the case with the industrial emergency brake according to the invention in which the explosive component employed is simple and by its fracture directly intervenes in the system.

The explosive component may comprise a bolt, nut or washer. In any event it is advantageously a passive element necessitating no maintenance to keep it operational and it is well adapted to an economical performance of a simple passive function.

Preferably it assumes this function without any special arrangement and without any auxiliary means as in the case of such a component devoid of any explosive charge.

When the explosive element is ignited which may be actuated by remote control, closing an electrical circuit, this explosive charge produces the fracture of the component into at least two pieces and therefore the passive retaining function which it assumes up to then is suddenly ended.

Besides the great simplicity and the economical maintenance resulting from its use, such an explosive component has the following additional advantages.

First of all its response time is extremely short, nearly nil. As a result there is very great security.

Furthermore, in case there are a plurality of emergency brakes installed in a battery on the same brake member it is readily adapted, if not too abrupt braking action is desired, to modulated action of the emergency brakes by successive delayed detonation of the corresponding explosive charges.

These and other features and advantages of the invention will be brought out in the description which follows, given by way of example, with reference to the accompanying schematic drawings in which.

Figure 1:
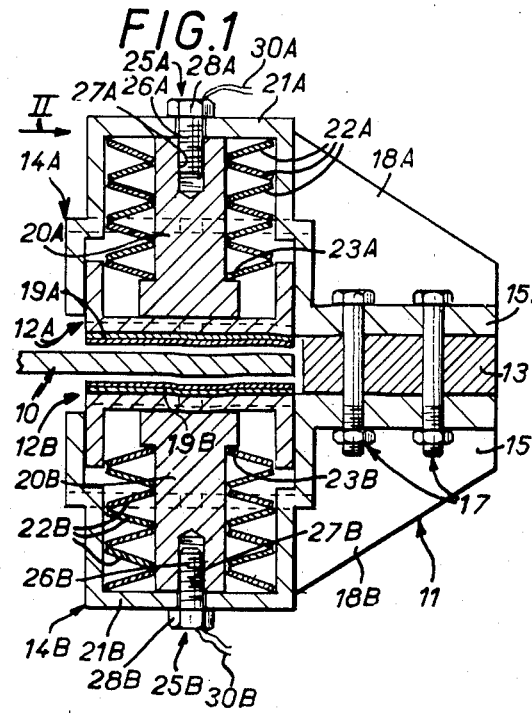
FIG. 1 is a longitudinal sectional view of an industrial emergency brake embodying the present invention, taken on line I—I in FIG. 2, in the disengaged position of the brake.

In the drawings the brake member is a rotatable disc 10. In addition to the disc 10 the industrial emergency brake embodying the invention comprises a fixed support 11 and at least one braking member adapted to be applied against the disc 10.

In the illustrated embodiment two braking members 12A, 12B are provided respectively adapted to operate on opposed sides of and symmetrically with respect to the disc 10.

The fixed support 11 comprises in line with the edge of the disc 10 and perpendicular to the axis thereof a support flange 13.

For guiding the braking members 12A, 12B there are provided two hollow bodies 14A, 14B each secured to one of the sides of the support flange 13. For this purpose the hollow bodies 14A, 14B are each secured to a base plate 15A, 15B by which they are fixed to support flange 13 for example by means of fastener assemblies 14 such as the nuts and bolts illustrated.

Reinforcing ribs 18A, 18B connect the hollow bodies 14A, 14B to their respective base plates 15A, 15B.

The braking members 12A, 12B are in cylinder-piston relation with hollow bodies 14A, 14B. The open ends of the hollow bodies are disposed adjacent the brake disc 10. The braking members 12A, 12B are slidably mounted in the open ends of the hollow bodies 14A, 14B. The inner sides of the braking members 12A, 12B respectively carry friction facings 19A, 19B. A control plunger 20A, 20B is arranged axially and fixed to the inside of each of the hollow bodies 12A, 12B.

Details of the construction of these features are known to those skilled in the art and will not be described in greater detail herein. Thus the connection between each braking member 12A, 12B and its control plunger 20A, 20B may, if desired, comprise a ball joint.

Force-applying means constantly urge each braking member 12A, 12B towards the disc 10. In the illustrated embodiments the force-applying means comprise resilient means, for example as shown, a stack of Belleville washers 22A, 22B received on its respective control plunger 20A, 20B and bearing against the fixed support 11, and more specifically the end wall 21A, 21B of the associated hollow body 14A, 14B. The radially innermost Belleville washer 23A, 23B bears against a shoulder 23A, 23B on the control plunger 20A, 20B.

Each of the braking members 12A, 12B is also subjected to the action of releasable retaining means normally maintaining the associated braking member out of engagement with the disc 10 as illustrated in FIG. 1.

According to the invention the releasable retaining means comprise at least one frangible explosive component containing an explosive charge adapted to fracture the element upon detonation.

In the embodiment of FIGS. 1–5 the frangible explosive component employed comprises an explosive bolt 25A, 25B which is in threaded engagement with the associated braking member 12A, 12B, and more particularly with the control plunger 20A, 20B integral with the braking member. For this purpose the control plungers 20A, 20B have axially extending tapped bores 27A, 27B at their free ends. The head 28A, 28B of each bolt 25A, 25B bears against the fixed support 14A, 14B and more particularly the end wall 21A, 21B of the corresponding hollow body 14A, 14B which has an axial aperture adapted to receive the threaded shank 26A, 26B of the corresponding explosive bolt 25A, 25B.

The construction of such an explosive bolt is well known per se and therefore need not be described herein in great detail. Suffice is to say that such an explosive bolt contains an explosive charge and is connected by a lead wire 30A, 30B to ignite the explosive charge. Upon detonation the head 28A, 28B of each bolt is adapted to break away from its threaded shank 26A, 26B.

Disengagement means are preferably provided to ensure spacing of the braking members 12A, 12B from the brake disc 10 when the brake is commissioned or each time it is put back into service. Indeed, without anything other than the threads of the bolts 25A, 25B to determine this spacing it would be inconvenient owing to the resilient load due to the stack of Belleville washers 22A, 22B that has to be overcome.

Figure 2:
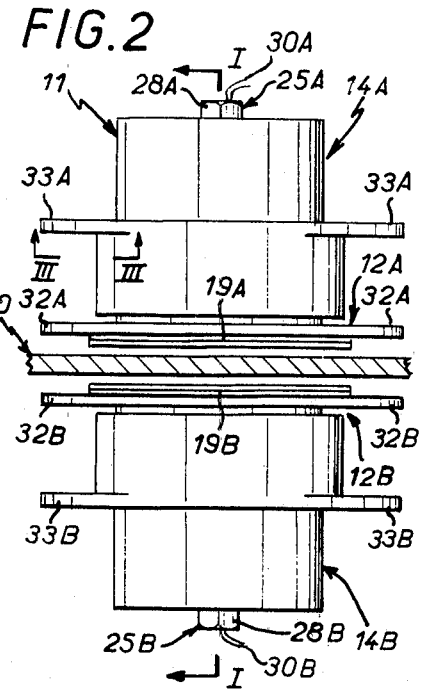
FIG. 2 is an elevational view of this industrial emergency brake taken in the direction of arrow II in FIG. 1.
Figure 4:
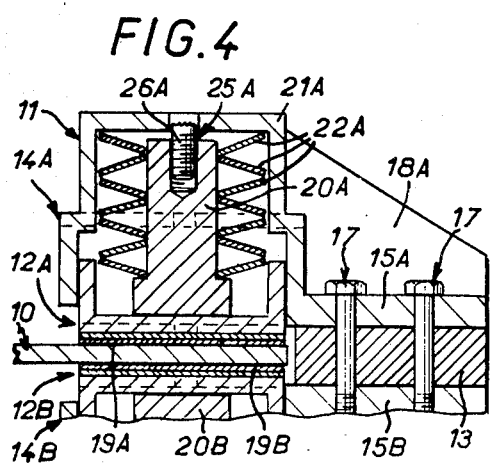
FIG. 4 is a fragmentary view similar to that of FIG. 1 showing the brake engagement position.
Figure 5:
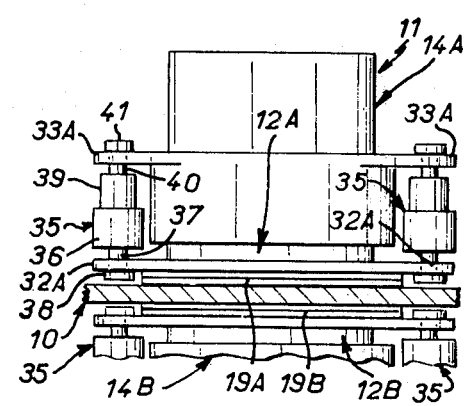
FIG. 5 is a fragmentary view similar to that of FIG. 2 for the engagement position and illustrates an embodiment of the disengagement means adapted to be associated with a brake embodying the invention.

In the embodiment of FIGS. 1–5 disengagement means comprise, for each braking member 12A, 12B, at least two lugs 32A and 33A, 32B and 33B formed opposite one another on the braking member 12A, 12B and on the fixed support 11, and more specifically as regards the latter on the hollow body 14A, 14B projecting laterally therefrom, FIGS. 2 and 5.

Figure 3:
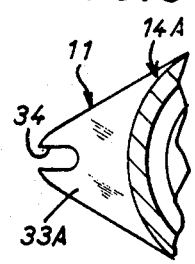
FIG. 3 is a fragmentary view in plan and section taken on line III—III in FIG. 2.

In actual practice two pairs of lugs 32A, 33A and 32B, 33B are provided in diametrically opposed positions relative to one another. Such lugs, of which lug 33A is shown on its own in FIG. 3, are each provided with a radially extending notch 34.

Each pair of lugs 32A, 33A and 32B, 33B is thus adapted to accommodate jack means such as a piston-and-cylinder unit 35 perpendicular to the plane of the disc 10 as illustrated in FIG. 5. Such a piston-and-cylinder unit 35 comprises a cylinder 36 connected to a tie rod 37 whose free end terminates by a head 38 engaging the lug 32A, 32B on its side remote from the cylinder 36, and a piston 39 connected to a tie rod 40 whose free end terminates by a head 41 engaging the lug 33A, 33B on its side remote from the piston 39.

By use of such piston-and-cylinder units 35 it is possible to keep the braking members 12A, 12B out of contact with the disc 10 until the abutment of the control plungers 20A, 20B with the end wall 21A, 21B of the corresponding hollow bodies 14A, 14B.

The explosive bolts 25A, 25B may then be easily threaded into position. Thereafter the piston-and-cylinder units 35 are removed by lateral displacement and may be used for a similar action on other brakes. In operation the explosive bolts 25A, 25B constantly maintain the braking members 12A, 12B out of engagement with the disc 10 against the action of the stacks of Belleville washers 22A, 22B.

When necessary the ignition of the explosive charge is produced by supply current to lead wires 30A, 30B, current being supplied to the lead wires by manual control means or automatically by means of a speed sensing means (not illustrated in the drawings).

Thereafter owing to the ignition of the explosive charge, the head 28A, 28B of each bolt 25A, 25B is broken away from threaded shank 26A, 26B as represented in FIG. 4.

Immediately upon the braking members' 12A, 12B release they are applied into engagement with the brake disc 10 by the stacks of Belleville springs 22A, 22B. The brake is not damaged by the detonation of the explosive bolts; only these bolts are replaced for the brake to be put back into service again. This operation is carried out, for example, as described hereinabove.

Alternatively, the relative displacement of the braking members necessary for easy screwing of the explosive bolts 25A, 25B may, for example, be carried out by the disc 10 when the disc or the part on which it is secured admits of axial reciprocating movement in both directions.

Figure 6:
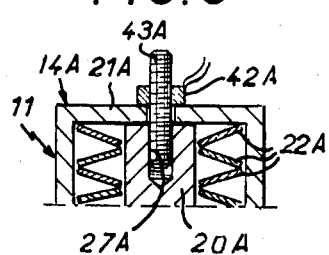
FIGS. 6 and 7 are respectively two modifications of the embodiment of FIGS. 1-5.

According to the alternative embodiment illustrated in FIG. 6 which relates to the control of the braking member 12A the explosive component associated therewith is an explosive nut 42A which is in threaded engagement with the threaded shank 43A which in turn is in threaded engagement with the braking member 12A and more particularly in a tapped bore 27A in the control plunger 20A. As above the explosive nut 42A bears against the fixed support 11 and more particularly the end wall 21A of the corresponding hollow body 12A.

Upon ignition of the explosive charge the explosive nut 42A is fractured into at least two parts thereby freeing the braking member 12A as in the preceding embodiment.

But in the embodiment of FIG. 6 the threaded shank 43 may be made sufficiently long to be gripped from outside the hollow body 14A when the braking member 12A is urged into engagement with the brake disc 10 and thereby may be used to disengage the braking member from the brake disc. Obviously this alternative embodiment is adapted to be used on the other braking member 12B.

Figure 7:
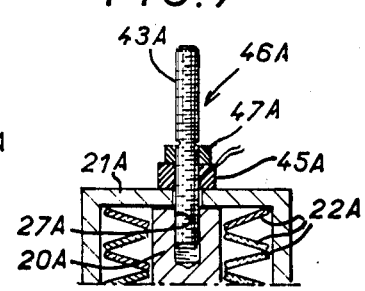

The alternative embodiment of FIG. 7 is shown with respect to only one braking member but obviously may be used on the opposed braking member. In this embodiment the explosive component is comprised of an explosive component 45A which defines a spacer interposed between the fixed support 11 and more specifically the end wall 21A of the corresponding hollow body 14A and a stud bolt 46A connected to the braking member 12A and more particularly the control plunger 20A thereof.

In the illustrated embodiment the stud bolt 46A comprises a threaded shank 43A threadedly engaged in the tapped bore 27A in the control plunger 20A and threadedly engaged with a nut 47A in contact with the explosive washer or spacer 45A.

With this embodiment the braking member may be disengaged from the brake disc by means of a tool such as a wrench or spanner adapted to displace the stud bolt 36A together with the control plunger 20A in threaded engagement therewith out of contact with the brake disc.

The present invention is not intended to be limited to the illustrated and described embodiments but covers all modifications and alternatives without departing from the spirit and scope of the invention defined by the appended claims.

In particular the stud bolt 46A of the FIG. 7 embodiment is not necessarily threaded but may be provided with quarter-turn coupling means or may be secured to the corresponding braking member by a key. In either case the stud has a shoulder against which the explosive washer bears.

Furthermore the field of use of the invention is not necessarily limited to disc type industrial brakes but may be associated with a cylindrical or drum brake member or more generally any elongated brake member such as in certain belt brakes or jaw brakes regardless of the structure of the corresponding brake.

Moreover it is for the sake of convenience that such a member is referred to as a "brake" member. Actually it may be any member against which a braking member may be applied; obviously it may be a fixed member if the braking member is carried on a movable unit. In any event there is relative movement between the member referred to as the brake member and the support which is taken as fixed herein against which engagement means may bear for acting on the braking member.

What is claimed is:

1. In an industrial emergency brake comprising a fixed support, at least one braking member adapted to be applied against a brake member, means constantly engaging and urging said braking member towards said brake member and releasable retaining means supporting said braking member against movement by said first-mentioned means and normally maintaining it out of engagement with the brake member, the improvement wherein said releasable retaining means comprises a frangible explosive component containing an explosive charge and adapted to be fractured upon detonation whereupon said first-mentioned means moves said braking member into engagement with the brake member.

2. The improvement of claim 1, wherein said explosive component comprises a bolt, said bolt having a threaded shank in threaded engagement with said braking member and a head bearing against said fixed support.

3. The improvement of claim 1, wherein said explosive component comprises a nut which is in threaded engagement with a threaded shank which in turn is in threaded engagement with the braking member, said nut bearing against said fixed support.

4. The improvement of claim 1, wherein said explosive component comprises a washer defining a spacer interposed between said fixed support and a stud bolt connected to the braking member.

5. The improvement of claim 4, wherein the washer is interposed between said fixed support and a nut in threaded engagement with said stud bolt.

6. The improvement of claim 1, together with means for moving said braking member out of engagement with the brake member characterized in that the last mentioned means comprise at least two lugs respectively provided on said braking member and said fixed support opposite each other for receiving and positioning jack means.

* * * * *